United States Patent
Zhang

(10) Patent No.: US 12,293,207 B2
(45) Date of Patent: May 6, 2025

(54) VIRTUAL MACHINE HOT MIGRATION METHOD, APPARATUS, ELECTRONIC DEVICE, AND COMPUTER STORAGE MEDIUM

(71) Applicant: Alibaba Group Holding Limited, Grand Cayman (KY)

(72) Inventor: Chao Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 526 days.

(21) Appl. No.: 17/591,459

(22) Filed: Feb. 2, 2022

(65) Prior Publication Data

US 2022/0156106 A1 May 19, 2022

Related U.S. Application Data

(63) Continuation of application No. PCT/CN2020/105032, filed on Jul. 28, 2020.

(30) Foreign Application Priority Data

Aug. 5, 2019 (CN) .......................... 201910715884.1

(51) Int. Cl.
 *G06F 9/455* (2018.01)
 *G06F 9/50* (2006.01)
 *G06F 12/10* (2016.01)

(52) U.S. Cl.
 CPC ........ *G06F 9/45558* (2013.01); *G06F 9/5016* (2013.01); *G06F 12/10* (2013.01); *G06F 2009/4557* (2013.01); *G06F 2009/45583* (2013.01); *G06F 2212/657* (2013.01)

(58) Field of Classification Search
 CPC .... G06F 9/45558; G06F 9/5016; G06F 12/10; G06F 2009/4557; G06F 2009/45583; G06F 2212/657
 See application file for complete search history.

(56) References Cited

U.S. PATENT DOCUMENTS

| | | | |
|---|---|---|---|
| 9,330,013 | B2 | 5/2016 | Li et al. |
| 9,672,075 | B2 | 6/2017 | Wang |
| 10,884,645 | B2 | 1/2021 | Chen et al. |
| 10,990,431 | B2 | 4/2021 | Liu et al. |
| 2009/0007106 | A1 | 1/2009 | Araujo, Jr. et al. |
| 2011/0066597 | A1 | 3/2011 | Mashtizadeh et al. |
| 2011/0302577 | A1 | 12/2011 | Reuther et al. |
| 2011/0320556 | A1 | 12/2011 | Reuther |
| 2015/0143372 | A1 | 5/2015 | Bercovici et al. |
| 2015/0378766 | A1 | 12/2015 | Beveridge et al. |
| 2021/0011856 | A1 | 1/2021 | Xia et al. |

*Primary Examiner* — Gregory A Kessler
(74) *Attorney, Agent, or Firm* — Lee & Hayes, P.C.

(57) ABSTRACT

Virtual machine hot migration method, device, electronic device, and computer storage medium are provided. The method includes: switching a first page table used for indicating a mapping relationship between a memory address of a virtual guest and a physical address of a host machine in a first physical machine to a second page table according to a switching trigger instruction; and performing a hot migration of the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size. The embodiments of the present disclosure improve the performance of the virtual guest and its hot migration.

18 Claims, 9 Drawing Sheets

VIRTUAL MACHINE HOT MIGRATION METHOD, APPARATUS, ELECTRONIC DEVICE, AND COMPUTER STORAGE MEDIUM

CROSS REFERENCE TO RELATED PATENT APPLICATIONS

This application claims priority to and is a continuation of PCT Patent Application No. PCT/CN2020/105032 filed on 28 Jul. 2020, and is related to and claims priority to Chinese Application No. 201910715884.1, filed on 5 Aug. 2019 and entitled "Virtual Machine Hot Migration Method, Apparatus, Electronic Device, and Computer Storage Medium," which are incorporated herein by reference in their entirety.

TECHNICAL FIELD

The present disclosure relates to the field of data processing technologies, and in particular, to virtual machine hot migration methods, apparatuses, electronic devices, and computer storage media.

BACKGROUND

Virtual machine hot migration is a key technology in cloud computing operations. Through virtual machine hot migration, a virtual guest can be migrated from one physical machine to another physical machine while ensuring the normal operation of the virtual guest, so as to realize dynamic dispatching of computing resources, and maintenance and repairs of failures of physical machines, etc.

Specifically, a process of virtual machine hot migration is to copy the memory of a virtual guest from one physical machine to another in an iterative manner, and the memory content of each copy is determined according to the memory paging of the virtual guest.

Traditional virtual guests generally use 4k BYTES memory paging mode, that is, the memory page size indicated by the last-level page table is 4k. Nowadays, in order to improve the performance of virtual guests, "large pages" are generally used in paging, for example, 2M BYTES or 1G BYTES memory paging mode is used. However, a change in the memory paging mode increases the bandwidth consumption of the virtual machine hot migration, which makes the virtual machine hot migration relatively more difficult. In existing technologies, in order to reduce the bandwidth consumption, the original 2M or 1G "large pages" are directly deleted before the hot migration, and a 4K page table is then reconstructed through abnormal page faults. However, this method will lead to the amount of abnormal page faults in a virtual guest is relatively large, which impairs the performance of the virtual guest.

In view of this, the technical problem that needs to be solved urgently in the existing technologies is how to provide another method for virtual machine hot migration with less difficulty.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of this, embodiments of the present disclosure provide virtual machine hot migration method, apparatus, electronic device, and computer storage medium to solve the above-mentioned problems.

According to the embodiments of the present disclosure, a virtual machine hot migration method is provided, and includes: switching a first page table used for indicating a mapping relationship between a memory address of a virtual guest and a physical address of a host machine in a first physical machine to a second page table according to a switching trigger instruction; and performing a hot migration of the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

According to the embodiments of the present disclosure, a virtual machine hot migration apparatus is provided, and includes: a switching module configured to switch a first page table used for indicating a mapping relationship between a memory address of a virtual guest and a physical address of a host machine in a first physical machine to a second page table according to a switching trigger instruction; a hot migration module configured to perform a hot migration of the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

According to the embodiments of the present disclosure, an electronic device is provided, and includes: a processor, a memory, a communication interface, and a communication bus, wherein the processor, the memory, and the communication interface conduct inter-communications with each other through the communication bus, and the memory is configured to store at least one executable instruction, the executable instruction causing the processor to perform operations corresponding to the virtual machine hot migration method as described above.

According to the embodiments of the present disclosure, a computer storage medium having a computer program stored thereon is provided, and the program, when executed by a processor, implements the virtual machine hot migration method as described above.

According to the solutions provided by the embodiments of the present disclosure, a first page table and a second page table are set in a first physical machine, and the first and second page tables are both used to indicate a mapping relationship between a memory address of a virtual guest and a physical address of a host machine to form a main/backup setting of the mapping relationship. A difference is that a size of a physical memory page indicated by a last-level page table of the second page table satisfies a defined size, such as the conventionally used 4K BYTES size, while a size of a physical memory page indicated by a last-level page table of the first page table is larger than the defined size, which is commonly referred to as a "large page". Thus, a virtual machine hot migration a can be realized according to the second page table. On the one hand, since the size of the physical memory page corresponding to the second page table satisfies the defined size, i.e., satisfying a size requirement of hot migration for the physical memory page, the success rate and performance of the virtual guest and the hot migration thereof are improved. On the one hand, using the main/backup setting and reasonable switching of the first page table and the second page table, a process of converting the page size of the physical memory to a page size required for hot migration will not introduce a suspension of the virtual machine or other problems that would impact the performance of operations of the virtual machine, thus greatly reducing adverse effects on operations of the virtual guest that are caused by a change in size of the page table of the hot migration.

BRIEF DESCRIPTION OF THE DRAWINGS

In order to explain the technical solutions of the embodiments of the present disclosure more clearly, drawings that need to be used in the description of the embodiments or the existing technologies will be briefly introduced hereinafter. Apparently, the drawings as described below represent only some embodiments recorded in the embodiments of the present disclosure. For one of ordinary skill in the art, other drawings can be obtained based on these drawings.

DETAILED DESCRIPTION

In order to enable one skilled in the art to better understand the technical solutions in the embodiments of the present disclosure, the technical solutions in the embodiments of the present disclosure will be clearly and completely described hereinafter with reference to the accompanying drawings in the embodiments of the present disclosure. Apparently, the described embodiments represent only a part and not all of the embodiments of the present disclosure. Based on the embodiments in the embodiments of the present disclosure, all other embodiments obtained by one of ordinary skill in the art should fall within the scope of protection of the embodiments of the present disclosure.

Specific implementations of the embodiments of the present disclosure will be further described below in conjunction with the accompanying drawings of the embodiments of the present disclosure.

Figure 1:
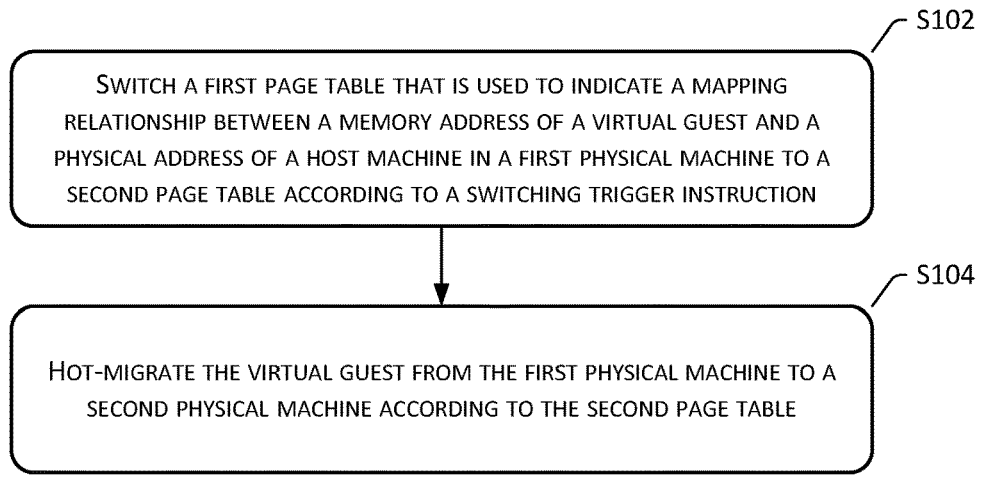
FIG. 1 is a flowchart of a method for a hot migration of a virtual machine according to the embodiments of the present disclosure.

Referring to FIG. 1, a flowchart of a virtual machine hot migration method 100 according to the embodiments of the present disclosure is shown.

The virtual machine hot migration method 100 includes the following steps:

Step S102: Switch a first page table that is used to indicate a mapping relationship between a memory address of a virtual guest and a physical address of a host machine in a first physical machine to a second page table according to a switching trigger instruction.

Under a virtual machine system, a physical machine can be virtualized into multiple virtual machines, and these multiple virtual machines are virtual guests. The physical machine can be regarded as a host machine of the multiple virtual machines. Multiple virtual guests use actual physical resources of the host machine through a page table used to indicate a mapping relationship between memory addresses of the virtual guest machines and physical addresses of the host machine. For example, in multiple virtual machine systems such as a KVM (Kernel-based Virtual Machine) virtual machine system, and a XEN virtual machine system, etc., EPT (Extended Page Tables) page tables are used to map between memory addresses of virtual guests and physical addresses of a host machine.

In the embodiments of the present disclosure, when implementing a hot migration of a virtual machine under a virtual machine system, a first page table and a second page table are set. Both the first page table and the second page table are page tables that are used to indicate a mapping relationship between a memory address of a virtual guest and a physical address of a host machine. An operation of switching between the first page table and the second page table is performed through a switching trigger instruction, and a virtual machine hot migration is then performed based on the operation of switching between the first page table and the second page table. The switching trigger instruction may be any appropriate instruction, or an instruction triggered by any appropriate triggering operation. After switching, the first page table can be marked as read-only, and if a write error exception occurs during the hot migration, the second page table can also be used for processing.

In addition, in this embodiment, the first page table and the second page table are both multi-level page tables. A size of a physical memory page indicated by a last-level page table of the second page table satisfies a defined size, and a size of a physical memory page indicated by a last-level page table of the first page table is greater than the defined size. The defined size can be set by one skilled in the art according to a memory page size required by a memory copy iteration of the hot migration. For example, it can be set to be 4K BYTES. A physical memory page that satisfies the defined size can be called as a "small page", and correspondingly, a physical memory page that is larger than the defined size can be called as a "large page", such as physical memory pages having 2M BYTES or 1G BYTES in size.

The second page table can be generated after further processing based on information in the first page table. For example, a "large page" in the first page table is divided into "small pages" and page table entries corresponding thereto are created to save the cost of generation and improve the efficiency of generation. Nevertheless, the present disclosure is not limited thereto. The second page table can also be generated in a conventional way of generating a page table, such as a generation method that is the same as that of the first page table (for example, a method of generating an EPT page table), etc.

It should be noted that in the embodiments of the present disclosure, unless specified otherwise, quantities related to "many", such as "multi-level", "multiple", etc., all mean two or more. In addition, "first" and "second" are only used to distinguish different page tables, and do not mean that there is an inevitable order or timing relationship between these two page tables.

Step S104: Hot-migrate the virtual guest from the first physical machine to a second physical machine according to the second page table.

Since the size of the physical memory page indicated by the last-level page table of the second page table satisfies the defined size, i.e., satisfying a memory page size required by a memory copy iteration of virtual machine hot migration, the hot migration of the virtual guest from the first physical machine to the second physical machine can be realized based on the second page table.

Through this embodiment, a first page table and a second page table are set in a first physical machine, and the first and second page tables are both used to indicate a mapping relationship between a memory address of a virtual guest and a physical address of a host machine to form a main/backup setting of the mapping relationship. A difference is that a size of a physical memory page indicated by a last-level page table of the second page table satisfies a defined size, such as the conventionally used 4K BYTES size, while a size of a physical memory page indicated by a last-level page table of the first page table is larger than the defined size, which is commonly referred to as a "large page". Thus, a virtual machine hot migration a can be realized according to the second page table. On the one hand, since the size of the physical memory page corresponding to the second page table satisfies the defined size, i.e., satisfying a size requirement of hot migration for the physical memory page, the success rate and performance of the virtual guest and the hot migration thereof are improved. On the one hand, using the main/backup setting and reasonable switching of the first page table and the second page table, a process of converting the page size of the physical memory to a page size required for hot migration will not introduce a suspension of the virtual machine or other problems that would impact the performance of operations of the virtual machine, thus greatly reducing adverse effects on operations of the virtual guest that are caused by a change in size of the page table of the hot migration.

The virtual machine hot migration method of this embodiment can be executed by any appropriate electronic device with data processing capabilities, which includes, but is not limited to, a server, a mobile terminal (such as a tablet computer, a mobile phone, etc.), and a PC.

Figure 2:
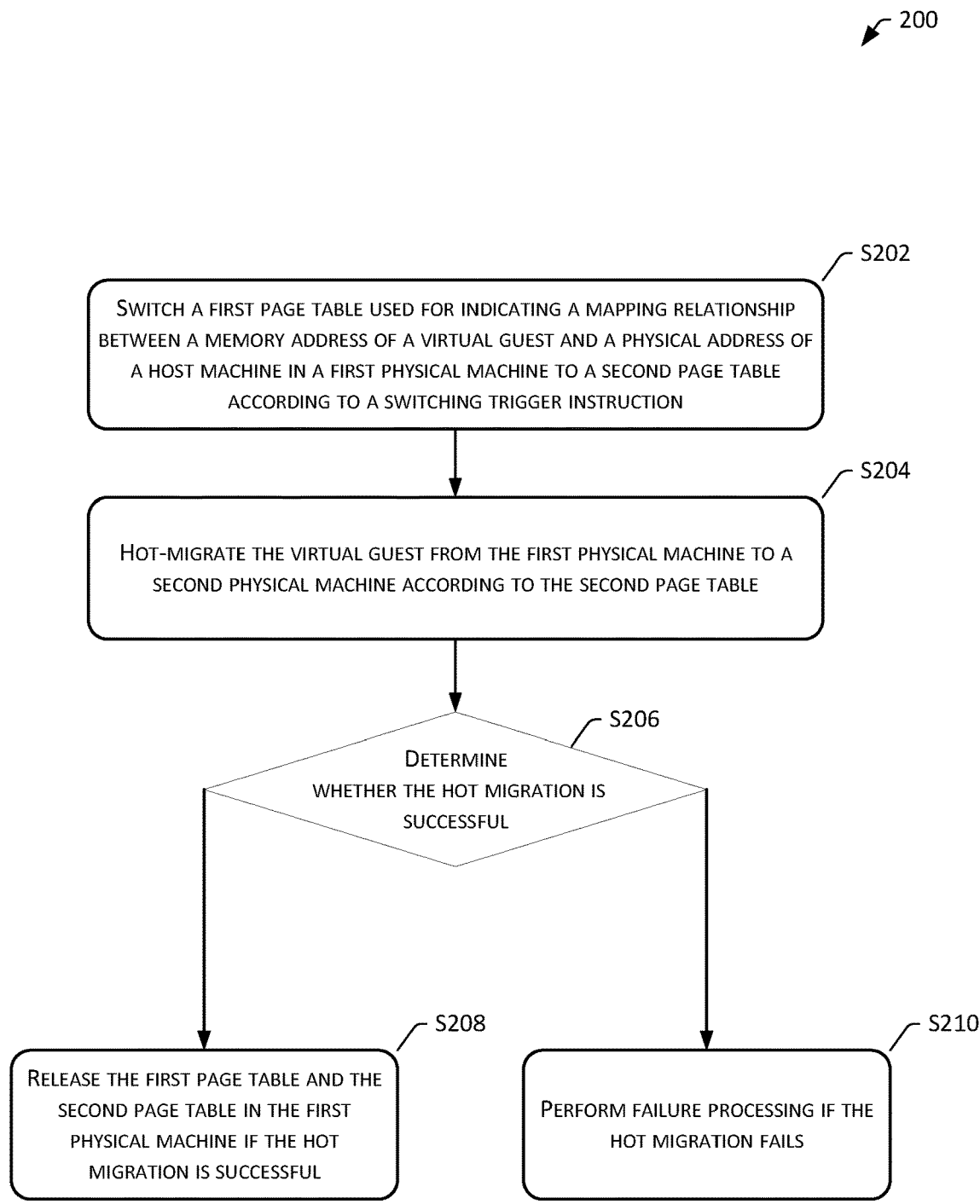
FIG. 2 is a flowchart of a method for a hot migration of a virtual machine according to the embodiments of the present disclosure.

Referring to FIG. 2, a flowchart of a virtual machine hot migration method 200 according to the embodiments of the present disclosure is shown.

The virtual machine hot migration method 200 includes the following steps:

Step S202: Switch a first page table used for indicating a mapping relationship between a memory address of a virtual guest and a physical address of a host machine in a first physical machine to a second page table according to a switching trigger instruction.

A size of a physical memory page indicated by a last-level page table of the second page table satisfies a defined size, and a size of a physical memory page indicated by a last-level page table of the first page table is greater than the defined size. The defined size is as described in the foregoing embodiments, and can be set by one skilled in the art according to a memory page size required by a memory copy iteration of hot migration. For example, it can be set to be 4K BYTES. Under multiple virtual machine systems such as a KVM virtual machine system and a XEN virtual machine system, etc., both the first page table and the second page table can adopt a form of EPT (Extended Page Tables) page tables.

In a feasible way, this step can be implemented as follows: switching a currently used active page table of the virtual machine from the first page table to the second page table according to the switching trigger instruction; and sending an instruction signal used for instructing to reload a page table to all virtual guests in the first physical machine, to instruct each virtual guest to switch a currently used page table node in the first page table to a corresponding page table node in the second page table.

A virtual guest needs to use memory resources of a host machine through a page table in an active state. In order to realize a hot migration of a virtual machine in case of "large pages", the embodiments of the present disclosure provide a first page table and a second page table. The first page table can be considered as a page table pointing to the "large pages", and the second page table can be considered as a page table pointing to "small pages". Based thereon, when performing a hot migration of a virtual machine, it is necessary to switch a currently used active page table of the virtual machine from the first page table to the second page table, and then send an instruction signal for instructing to reload a page table to all virtual guests in the first physical machine, thus performing page table switching in a unit of a virtual guest, so as to reduce the impact of the page table switching on the performance of the virtual guests.

In implementations, the page table switching may be performed in a unit of a virtual processor (VCPU), and the page table switching may further reduce the impact on the performance of the virtual guests. In this case, sending the instruction signal for instructing to reload the page table to all the virtual guests in the first physical machine to instruct each virtual guest to switch the currently used page table node in the first page table to the corresponding page table node in the second page table, includes: sending an instruction signal for instructing to reload the page table to virtual processors corresponding to all the virtual guests in the first physical machine, so as to instruct each virtual processor to switch the currently used page table node in the first page table to the corresponding page table node in the second page table.

When the currently used active page table of the virtual machine is switched from the first page table to the second page table according to the switching trigger instruction, in a feasible solution, after receiving the switching trigger instruction, the second page table can be created according to the first page table. After the second page table is successfully created, the currently used active page table of the virtual machine is switched from the first page table to the second page table. Nevertheless, the present disclosure is not limited thereto. The second page table can also be created in advance, and switching can be performed directly after receiving the switching trigger instruction. Using the method of creating the second page table according to the first page table after receiving the switching trigger instruction (the second page table is created according to the switching trigger instruction, i.e., created only after the hot migration is determined), on the one hand, can ensure that the second page table will be used, and avoid the wastes of data and resources caused by the second page table that has been created in advance but may not be used in the future. On the other hand, creating the second page table based on the first page table improves the efficiency of creation, and also guarantees a smooth transition of switching and the performance of the virtual machine.

In order to reduce the cost of page table switching and improve the efficiency of page table switching, the embodiments of the present disclosure further provide a way to implement page table switching through variables. In this way, when a currently used active page table of a virtual machine is switched from the first page table to the second page table, a variable value corresponding to a first variable pointing to a root page table of the active page table of the virtual machine is first determined. According to the variable value the currently used active page table of the virtual machine is determined as the first page table. The first variable is then reset to a defined value. The first page table is deactivated according to the defined value, and the second page table is activated as an active page table of the virtual machine. The defined value can be appropriately set by one skilled in the art according to an actual situation, and can be a number, a letter or a symbol, or a combination thereof. For example, active_page is taken as the first variable. When active_page is 1, this indicates that the currently used active page table of the virtual machine is the first page table. When active_page is 0, this indicates that the currently used active page table of the virtual machine is the second page table. By changing the variable value of active_page, an instruction of switching the page table can be realized.

In a KVM virtual machine system, the first variable may be a MMU_NODE variable of a memory management unit node. A MMU lock is set to protect MMU resources. As such, before the first variable is reset to the defined value, a memory management unit MMU corresponding to the first variable can also be locked. Furthermore, after the second page table is activated as the active page table of the virtual machine, the MMU is then unlocked. In this way, the exclusive use of MMU resources is guaranteed. The method of using the MMU_NODE variable facilitates subsequent rapid switching of the first page table and the second page table by changing the value of NODE, and is compatible with existing code logic to the greatest possible extent. But as mentioned earlier, other forms of variables are also applicable.

In addition, based on the setting of the first variable, the virtual processors corresponding to all virtual guests in the first physical machine are used to send the instruction signal for instructing to reload the page table to instruct each virtual processor to switch the currently used page table node in the first page table to the corresponding page table node in the second page table, each virtual processor can switch the currently used page table node in the first page table to the corresponding page table node in the second page table using the following method, which includes: each virtual processor checking whether a variable value of a second variable pointing to a root page table currently used by each virtual processor is consistent with the variable value of the first variable according to the instruction signal; if not, using the variable value of the first variable to replace the variable value of the second variable. By replacing a variable value, a page table node used by a virtual processor can be switched simply and quickly, which improves the efficiency of switching.

As can be seen, through the above process, switching between the first page table and the second page table is effectively realized. Based thereon, the following step S204 can be performed.

Step S204: Hot-migrate the virtual guest from the first physical machine to a second physical machine according to the second page table.

A size of a physical memory page indicated by a last-level page table of the second page table satisfies a defined size, such as 4K BYTES, which can effectively meet the memory page size required by hot migration of the virtual machine. Through the second page table, updating memory page tables of all the virtual guests can be completed at once to reduce the impact of hot migration on the performance of the virtual machines and users.

Step S206: Determine whether the hot migration is successful; perform step S208 if successful; or perform step S210 otherwise.

Determining whether the hot migration of the virtual machine is successful can be implemented in a conventional manner, such as whether the virtual guest is running normally, whether the data is complete, etc., which is not limited in the embodiments of the present disclosure.

Step S208: Release the first page table and the second page table in the first physical machine if the hot migration is successful, and end this process.

After the hot migration is successful, memory data of the virtual guest is successfully copied from the first physical machine to the second physical machine. After the hot migration, the virtual guest can use corresponding data and mechanism in the second physical machine to perform normal operation. In this case, the first page table and the second page table in the first physical machine can be released, including releasing data related to the page tables and occupied resources, etc.

Step S210: Perform failure processing if the hot migration fails.

In one case, after the operation of hot migration is performed, the virtual guest cannot work normally on the second physical machine. In other words, although the hot migration is performed, the hot migration is not successful and a rollback operation is triggered. For this failure situation of hot migration, the second page table can be switched back to the first page table, and the second page table in the first physical machine is released. In other words, by switching the second page table back to the first page table, the virtual guest can work normally according to the first page table in the cloud, and the second page table is released. In this situation, the failure of hot migration may be caused by reasons such as a non-convergence of the migration, etc. Therefore, an operation of switching back to the first page table and a rollback operation of the hot migration can be performed to ensure that the virtual guest works in the original state and continues to use the first page table, which improve the performance of the virtual machine and avoid affecting the usage of users.

In another case, if a hot migration exception occurs during the process of hot migration (such as abnormal exit or shutdown of the virtual guest machine), the second page table can be released first, and the first page table is released after the currently used active page table of the virtual machine is then switched back to the first page table. Specifically, the hot migration has not been completed, and an abnormality occurs during the hot migration. At this time, related data and occupied resources of the first page table and the second page table need to be released.

It should be noted that, in practical applications, the first and second page tables can also be released at the same time. However, the method of releasing the second page table first, and then switching the currently used active page table of the virtual machine back to the first page table and releasing it thereafter is more in line with the actual code logic implemented by the solutions.

Through steps S206-S210, processing of unsuccessful hot migration is effectively realized, and the reliability and security of hot migration are ensured.

Through this embodiment, a first page table and a second page table are provided in a first physical machine, and the first and second page tables are both used to indicate a mapping relationship between memory addresses of a virtual guest and physical addresses of a host machine to form a main/backup setting of the mapping relationship. A difference is that a size of a physical memory page indicated by a last-level page table of the second page table satisfies a defined size, such as the conventionally used 4K BYTES size, while a size of a physical memory page indicated by a last-level page table of the first page table is larger than the defined size, which is commonly referred to as a "large page". Thus, a hot migration of a virtual machine can be realized according to the second page table. On the one hand, since the size of the physical memory page corresponding to the second page table satisfies the defined size, that is, satisfying a size requirement for physical memory pages of the hot migration, thus improving the success rate and performance of the virtual guest and its hot migration. On the one hand, through the main/backup setting and reasonable switching of the first page table and the second page table, a process of converting the physical memory page size to a page size required for hot migration will not introduce a suspension of the virtual machine or other problems that impact the performance on operations of the virtual machine, thus greatly reducing adverse effects on operations of the virtual guest that are caused by a size change of page table of the hot migration.

The virtual machine hot migration method of this embodiment can be executed by any appropriate electronic device with data processing capabilities, including but not limited to: a server, a mobile terminal (such as a tablet computer, a mobile phone, etc.), and a PC.

Figure 3:
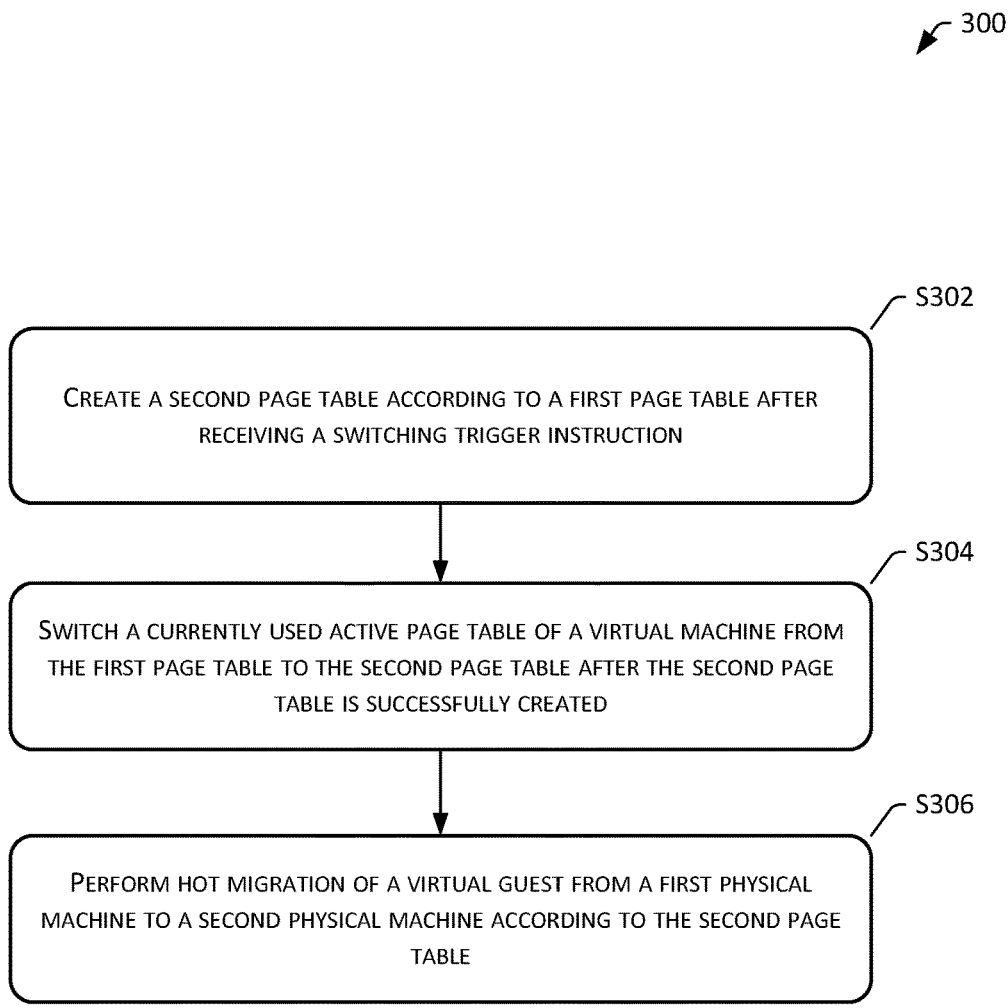
FIG. 3 is a flowchart of a method for a hot migration of a virtual machine according to the embodiments of the present disclosure.

Referring to FIG. 3, a flowchart of virtual machine hot migration method 300 according to the embodiments of the present disclosure is shown.

This embodiment focuses on how to create a second page table, and the virtual machine hot migration solutions provided by the embodiments of the present disclosure are described.

The virtual machine hot migration method 300 includes the following steps:

Step S302: Create a second page table according to a first page table after receiving a switching trigger instruction.

A size of a physical memory page indicated by a last-level page table of the second page table satisfies a defined size, and a size of a physical memory page indicated by a last-level page table of the first page table is greater than the defined size. The defined size is can be set by one skilled in the art according to a memory page size required by a memory copy iteration of hot migration as described in the foregoing embodiments, and for example, can be set to 4K BYTES.

In a feasible manner, a memory reverse mapping table corresponding to a virtual memory slot pointed to by the first page table may be traversed, and the second page table may be created according to a traversal result, thus achieving a rapid creation of the second page table. In another feasible way, it is also possible to directly traverse the first page table, and then create the second page table based on a traversal result and a corresponding "small page split" result.

The memory reverse mapping table records a mapping relationship that reflects a physical memory address of a host machine and a virtual address corresponding thereof. Whenever a physical memory page is mapped to a new virtual address space (here, a virtual guest physical address), a last-level page table entry corresponding to the physical memory page is recorded in the memory reverse mapping table. The memory of a virtual guest is formed by multiple virtual memory slots (memslot). Each memslot does not overlap with each other. Specifically, by traversing a memory reverse mapping table corresponding to each virtual memory slot (memslot), a mapping relationship between a memory address of the virtual guest and a corresponding physical memory address can be obtained. Based thereon, data and information used to create the second page table can be obtained. Furthermore, since the size of the physical memory page indicated by the last-level page table of the second page table needs to satisfy the defined size, further processing needs to be performed according to the traversal result of the corresponding memory reverse mapping table. For example, after splitting page(s) having a size that is greater than the defined size from among physical memory pages that are traversed according to the defined size, corresponding entries in the second page table are generated.

For example, creating the second page table according to the traversal result may include: generating a last-level page table entry in the second page table according to a copy of each last-level page table entry that is traversed, and mark the last-level page table entry that is generated using a set identifier; determining whether a size of a physical memory page pointed to by the last-level page table entry is greater than the defined size; and if being larger, deleting the set identifier corresponding to the last-level page table entry, and establishing at least one level of subpage table entry for the last-level page table entry according to the size of the physical memory page pointed to by the last-level page table entry, wherein a size of a physical memory page pointed to by a last-level page entry in the at least one level of subpage table entry is the defined size. The set identifier can be appropriately set by one skilled in the art according to actual needs, which is not limited in the embodiments of the present disclosure. The defined size is the same as above description, and is repeatedly described herein.

If a size of a physical memory page is larger than the defined size, this indicates that it is a "large page", and does not meet requirements for the last-level page table entry of the second page table. As such, the set identifier used to indicate the last-level page table entry needs to be deleted, and the "large page" is processed into "small pages". From a "large page" to "small pages" may require one or more levels of processing. For example, if the "large page" is 2M, it can be processed into 512 4K BYTES "small pages", and based thereon, first-level subpage table entries are then established under a current level of table entries in the second page table. Each subpage table entry points to a 4K BYTES physical memory page. And if the "large page" is 1G, it needs to be processed into 512 2M pages first, and each 2M page is then processed into 512 4K BYTES "small pages". Based thereon, two-level subpage table entries are established under a current level of table entries in the second page table. A first-level sub-page table entry points to a second-level sub-page table entry, and each second-level sub-page table entry points to a 4K BYTES physical memory page.

If the size of the physical memory page pointed to by the last-level page table entry that is generated is not greater than the defined size, this indicates that it points to a "small page", and can be copied and used directly.

In addition, for each last-level page table entry that is generated, a determination can also be made whether an upper-level page table corresponding to the generated last-level page table entry exists; if it does not exist, a corresponding upper-level page table is generated for the last-level page table entry, and is saved to the second page table. In this way, the completion and generation of the second page table is realized.

In some cases, a physical memory page of the host machine may be mapped to multiple memory pages of a virtual guest. At this time, the memory reverse mapping table stores a corresponding linked list of multiple last-level page table entries that point to the physical memory page. In this case, traversing the memory reverse mapping table corresponding to the virtual memory slot pointed to by the first page table and creating the second page table according to the traversal result include: obtaining the memory reverse mapping table corresponding to the virtual memory slot pointed to by the first page table; sequentially traversing entries of the memory reverse mapping table to determine whether the linked list is stored in a current table entry; if the linked list is stored, traversing each last-level page table entry in the linked list, and copying information of multiple last-level page table entries corresponding to the linked list and content of each last-level page table entry that is traversed into the second page table; and if the linked list is not stored, copying content of the current table entry into the second page table. As a result, a problem of generating page table entries corresponding to a physical memory page that is mapped to multiple virtual guest memory pages is effectively solved.

Step S304: Switch a currently used active page table of a virtual machine from the first page table to the second page table after the second page table is successfully created.

Details of implementations of switching the currently used active page table of the virtual machine from the first page table to the second page table can be referenced to the description in step S202, and are not repeated herein.

Step S306: Perform hot migration of a virtual guest from a first physical machine to a second physical machine according to the second page table.

Through this embodiment, a first page table and a second page table are provided in a first physical machine, and the first and second page tables are both used to indicate a mapping relationship between a memory address of a virtual guest and a physical address of a host machine to form a main/backup setting of the mapping relationship. A difference is that a size of a physical memory page indicated by a last-level page table of the second page table satisfies a defined size, such as the conventionally used 4K BYTES size, while a size of a physical memory page indicated by the last-level page table of the first page table is larger than the defined size, which is commonly referred to as a "large page". Thus, a hot migration of a virtual machine can be realized according to the second page table. On the one hand, since the size of the physical memory page corresponding to the second page table satisfies the defined size, i.e., satisfying the size requirement for physical memory pages of the hot migration, which improves the success rate and performance of the virtual guest and its hot migration. On the one hand, through the main/backup setting and reasonable switching of the first page table and the second page table, a process of converting the size of the physical memory page to a page size required for hot migration will not introduce a suspension of the virtual machine or other problems that impact the performance on operations of the virtual machine, thus greatly reducing adverse effects on operations of a virtual guest caused by a size change of the page table of the hot migration.

The virtual machine hot migration method 300 can be executed by any appropriate electronic device with data processing capabilities, including but not limited to: a server, a mobile terminal (such as a tablet computer, a mobile phone, etc.), and a PC.

Figure 4:
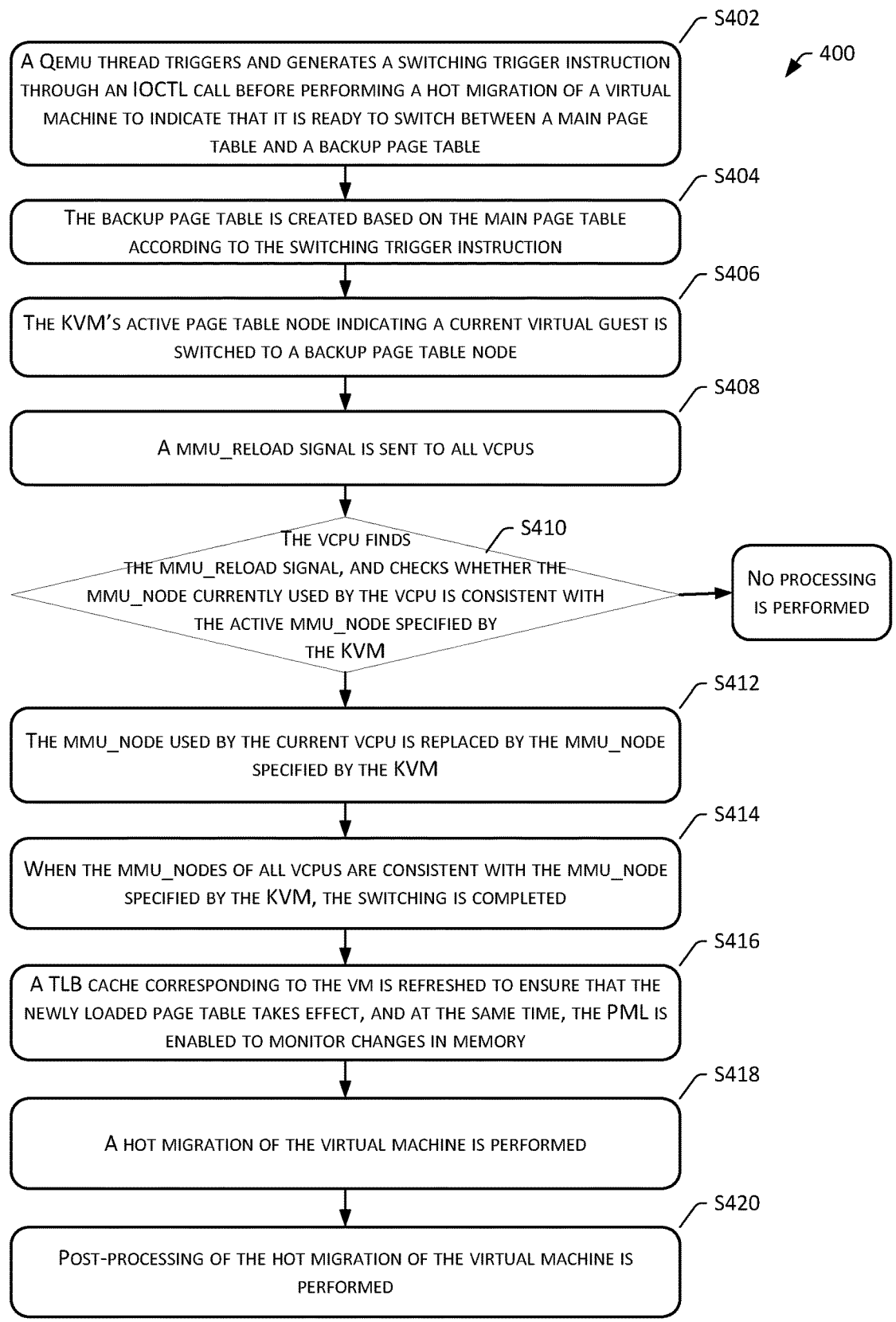
FIG. 4 is a flowchart of a method for a hot migration of a virtual machine according to the embodiments of the present disclosure.

Referring to FIG. 4, a flowchart of a virtual machine hot migration method 400 according to the embodiments of the present disclosure is shown.

This embodiment uses a KVM virtual machine system as an example to describe a virtual machine hot migration method provided by the embodiments of the present disclosure. KVM is a virtualization technology based on CPU hardware support, which can be implemented as a module of Linux, namely a KVM module. Only after Linux loads the KVM module, virtual machines can be created with other tools. However, a user cannot directly control an operating system kernel to perform operations only through the KVM module, but also need to use a corresponding user space tool, such as Qemu, to control a user space of KVM, i.e., performing tasks in a user mode of an operating system through Qemu.

In addition, in KVM, in order to realize memory virtualization, a virtual guest is allowed to use an isolated, zero-based and continuous memory space. KVM introduces a guest physical address space (Guest Physical Address, GPA). GPA is not a real physical address space, and is just a mapping of a virtual address space (HVA) of a host machine (a Host machine) in a virtual guest address space. For a virtual guest, GPA is a continuous address space starting from zero. However, for a host machine, a physical address space of a virtual guest is not necessarily continuous. A physical address space of a virtual guest may be mapped into a number of discontinuous address ranges of the host machine.

Since a virtual guest is essentially a process on a Host machine, the virtual guest is in a non-Root mode in a virtualization mode, and cannot directly access memory on the Host machine in a Root mode. At this point, an intervention of VMM (Virtual Guest Monitor) is required. VMM is used to intercept memory access instructions of the virtual guest, and then virtualize the memory on the Host machine, which is equivalent to adding a layer, namely, GPA, between a guest virtual address (GVA) of the virtual guest and a virtual address space (HVA) of the Host machine by VMM.

As can be seen, memory virtualization is to convert a virtual address of a virtual guest (Guest Virtual Address, GVA) into a physical address of a Host (Host Physical Address, HPA), and to go through conversions into a physical address of a virtual machine (Guest Physical Address, GPA) and a Host virtual address (Host Virtual Address, HVA) in between, namely: GVA→GPA→HVA→HPA. Through the above conversions, a memory mapping relationship between the virtual guest and the host machine is established, and the use of physical memory resources of the host by the virtual guest is thereby realized. In a hot migration of a virtual machine, operations such as page table generation and hot migration also need to be performed based on the memory mapping relationship as described above.

Based on this, the virtual machine hot migration method 400 includes the following steps:

Step S402: A Qemu thread triggers and generates a switching trigger instruction through an IOCTL call before performing a hot migration of a virtual machine to indicate that it is ready to switch between a main page table and a backup page table.

In this embodiment, the main page table is the first page table as described above, and the backup page table (also called a spare page table) is the second page table as described above.

It should be noted that, in this embodiment, using an IOCTL call to trigger and generate a switching trigger instruction is taken as an example only. However, in practical applications, one skilled in the art can also set other appropriate trigger operations or trigger conditions according to actual needs to generate a switching trigger instruction.

Step S404: The backup page table is created based on the main page table according to the switching trigger instruction.

In KVM, a physical memory of a virtual guest is divided into a number of memslots, and each memslot does not overlap each other. In this embodiment, the backup page table is created by sequentially traversing all memslots, and completing copying and rebuilding of page table entries of the physical memory corresponding to each memslot. Specifically, the backup page table is created by traversing entries of a memory reverse mapping (rmap) table of a current memslot.

A memory reverse mapping (rmap) is a data structure that records a correspondence relationship between a physical memory address and a virtual address thereof, and records a correspondence relationship between each physical memory page and a page table thereof. In practical applications, an EPT page table associated with a physical memory page can be found through a page frame number (gfn) of a guest physical memory page, i.e., rmap[gfn].

Whenever a host's physical memory page is mapped to a new virtual address space (i.e., a virtual machine physical address herein), an address of a last-level page table entry corresponding to the physical memory page is recorded in rmap[gfn]. When the host's physical memory page is mapped to multiple new virtual address spaces at the same time, rmap[gfn] recordd the first address of a pte linked list, and all last-level page table entries associated with such physical memory page are recorded in the pte linked list.

The multiple physical memory pages included in the physical memory of the virtual guest may be determined according to memory allocation information of the virtual machine, and the determined physical memory page may be represented by a page frame number (gfn) of the physical memory page. The physical memory of the virtual guest is composed of multiple memslots, and each memslot has a basegfn. The basegfn records a start offset of the memslot in the entire physical address space of the virtual guest. A gfn corresponding to each physical memory page in the memslot is calculated from the basegfn of the memslot and an offset of the physical memory page inside the memslot. In order to traverse the entire gfn, each memslot needs to be traversed once.

For each rmap[gfn], if it corresponds to multiple virtual address spaces, it is necessary to traverse each last-level page table entry in a pte linked table entry corresponding to the rmap[gfn]. After a traversal of all the last-level page table entries is completed, the traversal continues for a next gfn.

For each last-level page table entry obtained by the traversal, it is coped to the backup page table, that is, the backup EPT page table. Specifically, this may include: (a) if an upper-level page table corresponding to a last-level page table entry that is currently copied does not exist in the backup page table, creating a corresponding upper-level page table for the last-level page table entry and adding the corresponding upper-level page table to the backup page table (e.g., the same method for the first page table (such as EPT) is used); (b) determining whether a page pointed to by the last-level page table entry that is currently copied is a "large page", and returning to (a) to continue traversing a next page table entry if not being a "large page" after copying is completed; and if being a "large page", deleting a flag indicating that such page table entry is the last-level page table entry, and then sequentially creating all subpage table entries corresponding to the page table entry that points to the "large page".

Creating all the subpage table entries corresponding to the page table entry that points the "large page" includes: firstly querying a physical page frame number gfn of a virtual guest associated with the page table entry and an actual physical page frame number pfn thereof in the host machine from the page table entry that points to the "large page"; determining whether resources of a memory cache pool required to create page table entries are sufficient; if not being sufficient, adding cache resources to the cache pool; if being sufficient, for physical memories of all "small pages" covered by a physical memory of the "large page", sequentially creating corresponding multi-level "small page" page tables (for example, for a "large page" of 2M BYTES, create 2M BYTES and 4K BYTES-level page tables are needed to be separately created; for 1G BYTES "large page", three-level page tables of 1G BYTES, 2M BYTES, and 4K BYTES are needed to be separately created. When it comes to EPT page tables, 2-level, 3-level and 4-level page tables are needed to be created for a physical memory of 1G BYTES, and 3-level and 4-level page tables are needed to be created for a physical memory of 2M BYTES).

Furthermore, filling in entries of the backup page table, which includes: querying a first-level page table corresponding to gfn for page tables that are not the last-level page table (page tables other than the fourth-level page table) to determine whether a corresponding next-level page table exists; and if it does not exist, applying for a page table for the next-level page table, and filling information, such as a physical address of memory of the newly applied page table, etc., in a first-level page table. The above process is repeated until the last-level page table, that is, the fourth-level page table is reached. For the last-level page table (the fourth-level page table), corresponding gfn and pfn information is filled into the last-level page table according to memory attributes. For dirtybit of a memory attribute, a flag bit is set to 0 to facilitate subsequent tracking using pml. In addition, the last-level page table is added to the rmap structure corresponding to gfn. If multiple gfn exist, last-level page table entries need to be added to a corresponding rmap linked list. After a traversal of all physical memory is completed, a creation of the backup page table is completed.

Figure 5:
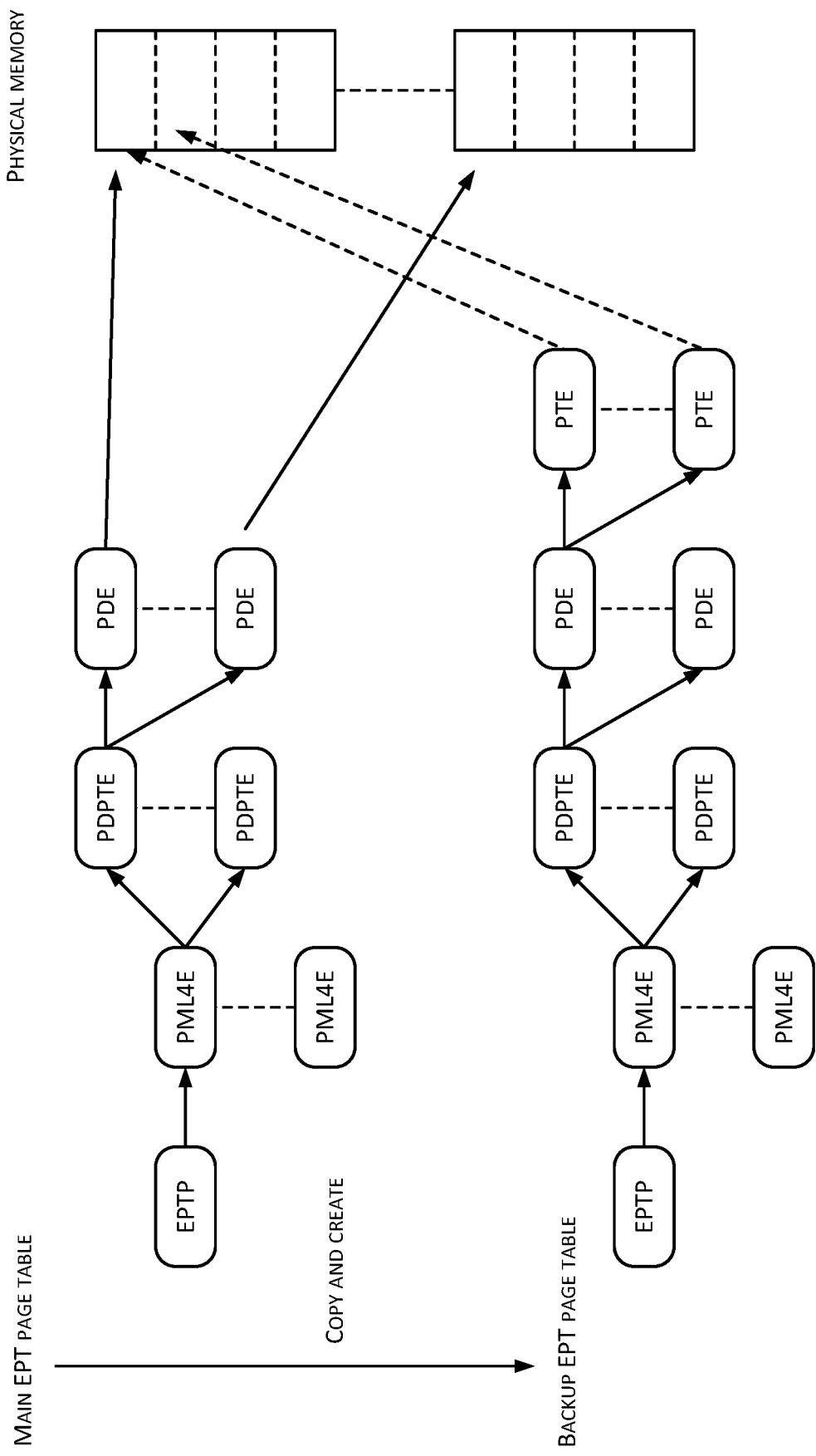
FIG. 5 is a schematic diagram of a first page table and a second page table in the embodiment as shown in FIG. 4.

A comparison between a created backup page table (that is, the second page table) and a main page table (that is, the first page table) is shown in FIG. 5. In FIG. 5, an example of using EPT page tables for both the main page table and the backup page table is used. The meaning of each node is the same as a regular EPT page table. In a main EPT page table as shown in FIG. 5, advanced page table entries such as PDE or PDPTE are directly used to point to a physically "large page". For example, PDE (a third-level page table) points to a 2M BYTES physical memory page (as shown by a solid box in FIG. 5), and PDPTE (a second-level page table) points to a 1G BYTES physical memory page (not shown in the figure). A backup EPT page table is created using the main EPT page table. As can be seen from FIG. 5, the backup EPT page table uses PTE (a fourth-level page table) to point to a 4K BYTES physical memory page (as shown by a dashed box in FIG. 5), and PTE is used as a last-level page table of the backup EPT page table to complete the mapping of the entire physical memory.

Step S406: The KVM's active page table node indicating a current virtual guest is switched to a backup page table node.

In this embodiment, in order to prevent the overall switching of the page tables from affecting the performance of the virtual guest, the switching process of the main and backup page tables is disassembled to the granularity of vcpu. To this end, this embodiment introduces two new variables kvm->mmu_node and vcpu->mmu_node, where kvm->mmu_node represents a root page table pointed to by a current KVM, and vcpu->mmu_node represents a root page table used by a current vcpu.

Based on the above variables, the switching between the main and backup EPT page tables can be completed by kvm->mmu_node=kvm->mmu_node^1, where "^1" means 1->0 (from 1 to 0) or 0->1 (from 0 to 1) operation. For example, if "1" is used to indicate the main EPT page table, and "0" is used to indicate the backup EPT page table, if switching from the main EPT page table to the backup EPT page table is needed, this can be achieved by kvm->mmu_node=kvm->mmu_node−1, for example.

In addition, in this embodiment, mmu_node is protected by a mmu lock, so the mmu lock needs to be obtained before changing mmu_node. In a process of creating and switching a backup page table, it is mutually exclusive with a memory hot swap operation.

Step S408: A mmu_reload signal is sent to all vcpus.

The mmu_reload signal will be called by all vcpus before entering guest mode next time to reload the page table.

Step S410: The vcpu finds the mmu_reload signal, and checks whether the mmu_node currently used by the vcpu is consistent with the active mmu_node specified by the KVM. If they are consistent, the mmu_reload signal is triggered for other reasons, and is not processed. If they are inconsistent, step S412 is executed.

Step S412: If the vcpu finds that the mmu_node used is inconsistent with the active mmu_node specified by the KVM, the mmu_node used by the current vcpu is replaced by the mmu_node specified by the KVM.

At the same time, an EPT root table used by the vcpu is switched to an EPT root table of the backup page table.

Step S414: When the mmu_nodes of all vcpus are consistent with the mmu_node specified by the KVM, the switching is completed.

Step S416: A TLB cache corresponding to the vm is refreshed to ensure that the newly loaded page table takes effect, and at the same time, the PML is enabled to monitor changes in memory.

TLB (Translation Lookaside Buffer) is a memory management unit that is used to improve the speed of conversion from a virtual address to a physical address. Each row in the TLB stores a block composed of a single PTE (Page Table Entry). With TLB, there is no need to access the memory twice every time when data is read (i.e., checking a page table to obtain a physical address and to read the data), which can be read directly from the TLB. A CPU provides a TLB refresh instruction, and refreshing the TLB is completed through the instruction and VPID information corresponding to the VM.

PML is a feature of a CPU. After this feature is turned on, the CPU records physical memory page information that has been rewritten by the CPU. The hot migration needs to record this rewrite information, so as to ensure that vm data of a source end and a destination end are consistent.

Step S418: A hot migration of the virtual machine is performed.

Specifically, according to the backup EPT page table after the switching, the virtual guest on the first physical machine is hot migrated to the second physical machine.

Step S420: Post-processing of the hot migration of the virtual machine is performed.

If the hot migration of the virtual machine is successful, the main page table and the backup page table can be released. If the hot migration of the virtual machine fails, the virtual guest needs to continue to work on the first physical machine, and steps S406-S416 can be repeated to switch the backup EPT page table back to the main EPT page table, in order to ensure that the virtual guest can use the main EPT page table, and thereby improve the performance of the virtual guest. After switching back to the main EPT page table, the backup EPT page table can be released.

In KVM, active_mmu_pages records address miniatures of all page table entries used by the current virtual guest, and the main and backup page tables each have one active_mmu_pages. After the virtual machine is hot migrated, a corresponding page table can be released by traversing the active_mmu_pages corresponding to the corresponding page table.

Releasing the backup page table is used as an example, and a process of releasing the backup page table includes: traversing each item in active_mmu_pages one by one; determining whether a current entry is active and whether page table child nodes exist; if page table child nodes exist, traversing all the child nodes, and recording all the child nodes to an invalid list; and releasing all page table entries in the invalid list, and thus releasing all page table memory.

The backup page table is used as an example above to describe the process of releasing the page table. Releasing the maiN page table adopts the same method as the above method of releasing the backup page table. One skilled in the art can implement the release of the main page table according to the above description, which is not repeatedly described herein.

Through this embodiment, for a problem that an abnormal page fault caused by a hot migration of a virtual machine brings great jitter to the performance of the virtual machine when using a "large page" to organize a page table in the existing technologies, the solutions provided in this embodiment actively analyze a memory mapping relationship of a virtual guest's rmap before the hot migration of the virtual machine, to perform backup and rebuild of an EPT page table of the virtual guest, and then sequentially reload a root directory entry root table of the EPT page table for each vcpu, switch a page table of the virtual guest from a main EPT page table to a backup EPT page table at one time, thereby switching the memory of the virtual guest to a standard 4K BYTES mode, which effectively improves the performance of the virtual machine and reduces the impact of the hot migration of the virtual machine on users.

The virtual machine hot migration method 400 can be executed by any appropriate electronic device with data processing capabilities, including but not limited to: a server, a mobile terminal (such as a tablet computer, a mobile phone, etc.), and a PC.

Figure 6:
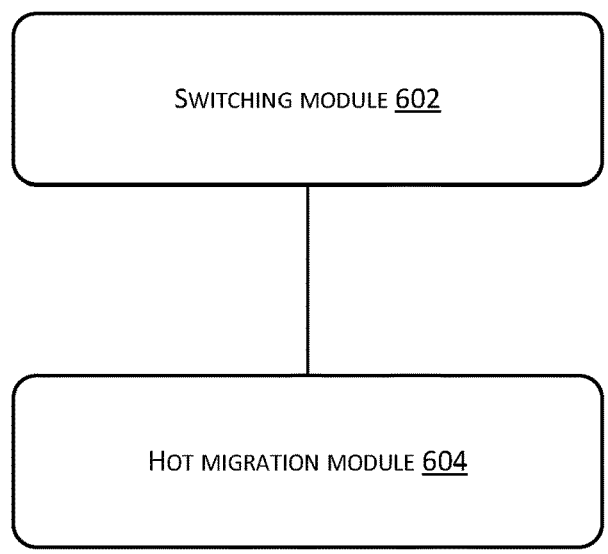
FIG. 6 is a structural block diagram of an apparatus for a hot migration of a virtual machine according to the embodiments of the present disclosure.

Referring to FIG. 6, a structural block diagram of a virtual machine hot migration apparatus 600 according to the embodiments of the present disclosure is shown.

The virtual machine hot migration apparatus 600 includes: a switching module 602 configured to switch a first page table used for indicating a mapping relationship between a memory address of a virtual guest and a physical address of a host machine in a first physical machine to a second page table according to a switching trigger instruction; and a hot migration module 604 configured to hot migrate the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

The virtual machine hot migration apparatus 600 is used to implement the corresponding virtual machine hot migration methods in the foregoing method embodiments, and has the beneficial effects of the corresponding method embodiments, which will not be repeated herein. In addition, functional implementations of each module in the virtual machine hot migration apparatus of this embodiment can be referenced to respective descriptions of corresponding parts in the foregoing method embodiments, and will not be repeated herein.

Figure 7:
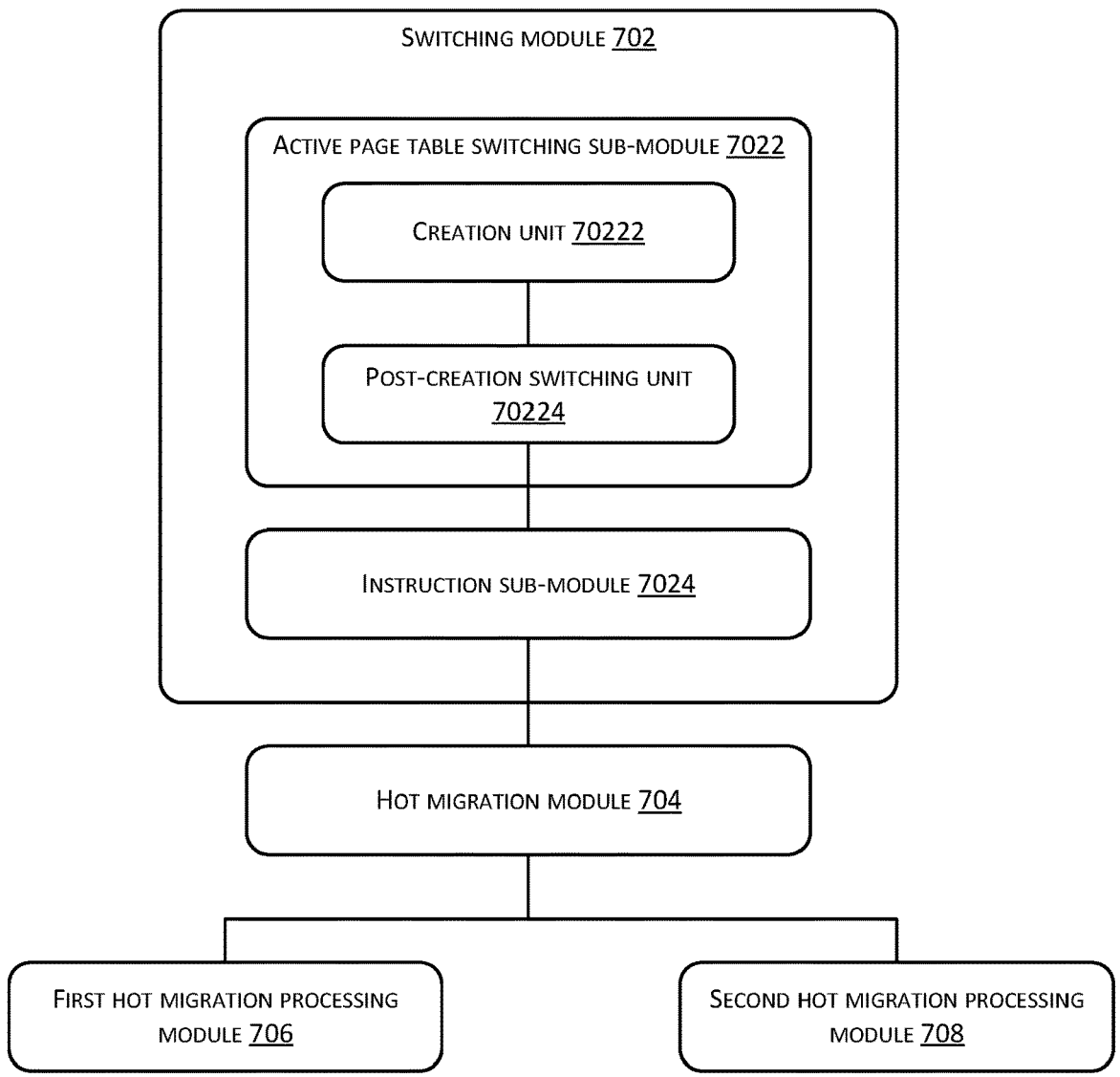
FIG. 7 is a structural block diagram of an apparatus for a hot migration of a virtual machine according to the embodiments of the present disclosure.

Referring to FIG. 7, a structural block diagram of a virtual machine hot migration apparatus 700 according to the embodiments of the present disclosure is shown.

The virtual machine hot migration apparatus 700 includes: a switching module 702 configured to switch a first page table used for indicating a mapping relationship between a memory address of a virtual guest and a physical address of a host machine in a first physical machine to a second page table according to a switching trigger instruction; and a hot migration module 704 configured to hot migrate the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

In implementations, the switching module 702 includes: an active page table switching sub-module 7022 configured to switch a currently used active page table of a virtual machine from the first page table to the second page table according to the switching trigger instruction; and an instruction sub-module 7024 configured to send an instruction signal for instructing to perform page table reloading to all virtual guests in the first physical machine, to instruct each virtual guest to switch a currently used page table node in the first page table to a corresponding page table node in the second page table.

In implementations, the active page table switching sub-module 7022 includes: a creation unit 70222 configured to create the second page table according to the first page table after receiving the switching trigger instruction; and a post-creation switching unit 70224 configured to switch the currently used active page table of the virtual machine from the first page table to the second page table after the second page table is successfully created.

In implementations, the post-creation switching unit 70224 is configured to determine a variable value corresponding to a first variable pointing to a root page table of the active page table of the virtual machine after the second page table is successfully created, and determine that the currently used active page table of the virtual machine is the first page table according to the variable value; and reset the first variable to a set value, deactivate the first page table according to the set value, and activate the second page table as the active page table of the virtual machine.

In implementations, the first variable is a variable of a memory management unit node MMU_NODE; and the post-creation switching unit 70224 is further configured to lock a memory management unit MMU corresponding to the first variable before resetting the value of the first variable to the set value; and unlock the MMU after activating the second page table as the virtual machine active page table.

In implementations, the instruction sub-module 7024 is configured to send an instruction signal for instructing to reload the page table to virtual processors corresponding to all virtual guests in the first physical machine, to instruct each virtual processor to switch the currently used page table node in the first page table to the corresponding page table node in the second page table.

In implementations, each virtual processor switches the currently used page table node in the first page table to the corresponding page table node in the second page table by the following method: each virtual processor checking whether a variable value of a second variable that points to a root page table currently used by the respective virtual processor is consistent with a variable value of the first variable according to the instruction signal; and if not, using the variable value of the first variable to replace the variable value of the second variable.

In implementations, the virtual machine hot migration apparatus of this embodiment further includes: a first hot migration processing module 706 configured to determine whether the hot migration is successful; release the first page table and the second page table in the first physical machine if the hot migration is successful; and switch the second page table back to the first page table, and release the second page table in the first physical machine if the hot migration fails.

In implementations, the creation unit 70222 is configured to traverse a memory reverse mapping table corresponding to a virtual memory slot pointed to by the first page table after receiving a switching trigger instruction, and create the second page table according to a traversal result.

In implementations, the creation unit 70222 is configured to traverse a memory reverse mapping table corresponding to a virtual memory slot pointed to by the first page table after receiving the switching trigger instruction; copy and generate a last-level page table entry in the second page table according to each last-level page table item that is traversed, and use a set identifier to mark the generated last-level page table entry; determine whether a size of a physical memory page pointed to by the generated last-level page table entry is greater than a set size; and if greater, delete the set identifier corresponding to the last-level page table entry, and create at least one-level sub-page table entry according to the size of the physical memory page pointed to by the last-level page table entry, wherein a size of a physical memory page pointed to by a last-level page table entry in the at least one-level sub-page table entry is the set size.

In implementations, the creation unit 70222 is further configured to determine whether an upper-level page table corresponding to the generated last-level page table entry exists; and if not exist, generate a corresponding upper-level page table for the last-level page table entry, and save thereof into the second page table.

In implementations, when a physical memory page of the host machine is mapped to multiple virtual guest memory pages, the memory reverse mapping table stores a linked list of corresponding multiple last-level page table entries that point to the physical memory page.

In implementations, when the creation unit 70222 traverses a memory reverse mapping table corresponding to a virtual memory slot pointed to by the first page table, and creates the second page table according to a traversal result: the memory reverse mapping table corresponding to the virtual memory slot pointed to by the first page table is obtained; entries of the memory reverse mapping table are traversed one by one to determine whether the linked list is stored in a current entry; if the linked list is stored, each last-level page table entry in the linked list is traversed, and information of multiple last-level page table entries corresponding to the linked list and content of each last-level page table entry that is traversed are copied to the second page table; if the linked list is not stored, content of the current table entry is copied to the second page table.

In implementations, the virtual machine hot migration apparatus of this embodiment further includes: a second hot migration processing module 708 configured to first release the second page table if a hot migration abnormality occurs during a process of the hot migration, and then release the first page table after the currently used active page table of the virtual machine is switched back to the first page table.

The virtual machine hot migration apparatus 700 is used to implement the corresponding virtual machine hot migration methods in the foregoing multiple method embodiments, and has the beneficial effects of the corresponding method embodiments, which will not be repeated herein. In addition, functional implementations of each module in the virtual machine hot migration apparatus of this embodiment can be referenced to respective descriptions of corresponding parts in the foregoing method embodiments, and will not be repeated herein.

An electronic device includes: a processor, a memory, a communication interface, and a communication bus. The processor, the memory, and the communication interface communicate with each other through the communication bus. The memory is used to store at least one executable instruction that causes the processor to perform operations corresponding to the virtual machine hot migration methods described above.

Figure 8:
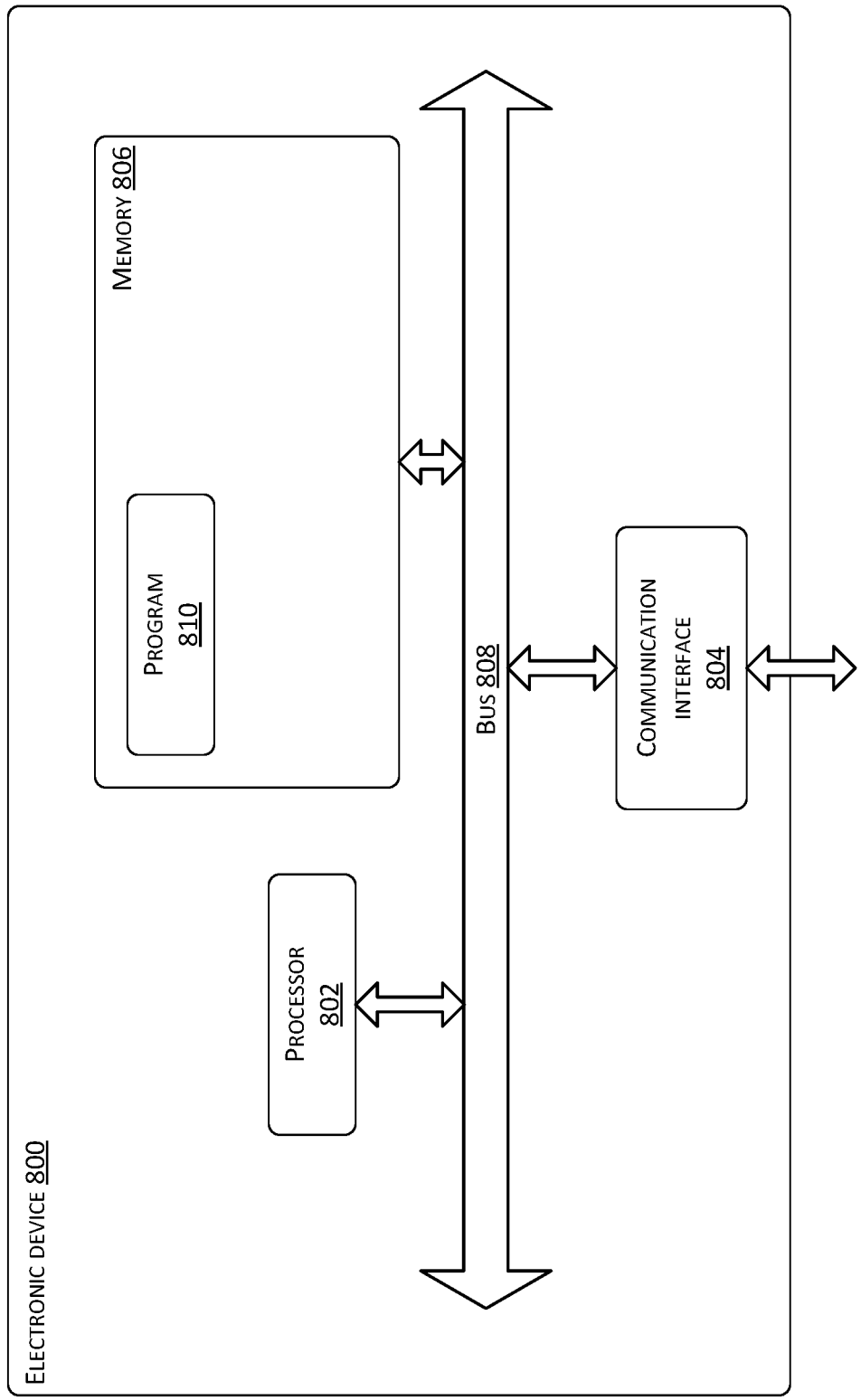
FIG. 8 is a schematic structural diagram of an electronic device according to the embodiments of the present disclosure.

Specifically, referring to FIG. 8, a schematic structural diagram of an electronic device 800 according to the embodiments of the present disclosure is shown, and the specific embodiment of the present disclosure does not limit specific implementations of the electronic device.

As shown in FIG. 8, the electronic device 800 may include: a processor 802, a communication interface 804, a memory 806, and a communication bus 808, wherein:

the processor 802, the communication interface 804, and the memory 806 communicate with each other through the communication bus 808.

The communication interface 804 is configured to communicate with other electronic devices or servers.

The processor 802 is configured to execute a program 810, and specifically can execute relevant steps in the aforementioned virtual machine hot migration method embodiments.

Specifically, the program 810 may include program codes, and the program codes include computer operation instructions.

The processor 802 may be a central processing unit CPU, or an Application Specific Integrated Circuit (ASIC), or one or more integrated circuits configured to implement the embodiments of the present disclosure. The one or more processors included in the electronic device may be processors of the same type, such as one or more CPUs, or different types of processors, such as one or more CPUs and one or more ASICs.

The memory 806 is configured to store the program 810. The memory 806 may include a high-speed RAM memory, and may also include a non-volatile memory (non-volatile memory), for example, at least one magnetic disk memory.

The program 810 may be specifically used to cause the processor 802 to perform the following operations: switching a first page table used for indicating a mapping relationship between a memory address of a virtual guest and a physical address of a host machine in a first physical machine to a second page table according to a switching trigger instruction; hot migrating the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

In an optional implementation, the program 810 is further configured to cause the processor 802 to switch a first page table used for indicating a mapping relationship between a memory address of a virtual guest and a physical address of a host machine in a first physical machine to a second page table according to a switching trigger instruction; switch a currently used active page table of a virtual machine from the first page table to the second page table according to the switching trigger instruction; and send an instruction signal for instructing to perform page table reloading to all virtual guests in the first physical machine, to instruct each virtual guest to switch a currently used page table node in the first page table to a corresponding page table node in the second page table.

In an optional implementation, when switching the currently used active page table of the virtual machine from the first page table to the second page table according to the switching trigger instruction, the program 810 is further configured to cause the processor 802 to: create the second page table according to the first page table after receiving the switching trigger instruction; and switch the currently used active page table of the virtual machine from the first page table to the second page table after the second page table is successfully created.

In an optional implementation, when switching the currently used active page table of the virtual machine from the first page table to the second page table according to the switching trigger instruction, the program 810 is further configured to cause the processor 802 to determine a variable value corresponding to a first variable that points to a root page table of the active page table of the virtual machine, and determine that the currently used active page table of the virtual machine as the first page table according to the variable value; reset the first variable to a set value, deactivate the first page table according to the set value, and activate the second page table as the active page table of the virtual machine.

In an optional implementation, the first variable is a memory management unit node MMU_NODE variable; and the program 810 is further configured to cause the processor 802 lock a memory management unit MMU corresponding to the first variable before the first variable is reset to the set value; and unlock the MMU after activating the second page table as the virtual machine active page table.

In an optional implementation, when sending an instruction signal for instructing to perform page table reloading to all virtual guests in the first physical machine to instruct each virtual guest to switch a currently used page table node in the first page table to a corresponding page table node in the second page table, the program 810 is further configured to cause the processor 802 to: send an instruction signal used for instructing the page table reloading to virtual processors corresponding to all the virtual guests in the first physical machine, to instruct each virtual processor to switch the currently used page table node in the first page table to the corresponding page table node in the second page table.

In an optional implementation, each virtual processor switches the currently used page table node in the first page table to the corresponding page table node in the second page table through the following method: each virtual processor checking whether a variable value of a second variable that points to a root page table currently used by the respective virtual processor is consistent with a variable value of the first variable according to the instruction signal; and if not, using the variable value of the first variable to replace the variable value of the second variable.

In an optional implementation, the program 810 is further configured to cause the processor 802 to determine whether the hot migration is successful; release the first page table and the second page table in the first physical machine if the hot migration is successful; and switch the second page table back to the first page table, and release the second page table in the first physical machine if the hot migration fails.

In an optional implementation, when creating the second page table according to the first page table, the program 810 is further configured to cause the processor 802 to: traverse a memory reverse mapping table corresponding to a virtual memory slot pointed to by the first page table, and create the second page table according to a traversal result.

In an optional implementation, when creating the second page table according to the traversal result, the program 810 is further configured to cause the processor 802 to: copy and generate a last-level page table entry in the second page table according to each last-level page table item that is traversed, and use a set identifier to mark the generated last-level page table entry; determine whether a size of a physical memory page pointed to by the generated last-level page table entry is greater than a set size; and if greater, delete the set identifier corresponding to the last-level page table entry, and create at least one-level sub-page table entry according to the size of the physical memory page pointed to by the last-level page table entry, wherein a size of a physical memory page pointed to by a last-level page table entry in the at least one-level sub-page table entry is the set size.

In an optional implementation, the program 810 is further configured to cause the processor 802 to determine whether an upper-level page table corresponding to the generated last-level page table entry exists; and if not exist, generate a corresponding upper-level page table for the last-level page table entry, and save thereof into the second page table.

In an optional implementation, when a physical memory page of the host machine is mapped to multiple virtual guest memory pages, the memory reverse mapping table stores a linked list of corresponding last-level page table entries pointing to the physical memory page.

In an optional implementation, when traversing the memory reverse mapping table corresponding to the virtual memory slot pointed to by the first page table, and creating the second page table according to the traversal results the program 810 is further configured to cause the processor 802 to: obtain the memory reverse mapping table corresponding to the virtual memory slot pointed to by the first page table; traverse entries of the memory reverse mapping table one by one to determine whether the linked list is stored in a current entry; traverse each last-level page table entry in the linked list and copy information of multiple last-level page table entries corresponding to the linked list and content of each last-level page table entry that is traversed to the second page table, if the linked list is stored; and copy content of the current entry to the second page table if the linked list is not stored.

In an optional implementation, the program 810 is further configured to cause the processor 802 to first release the second page table, and then release the first page table after the currently used active page table of the virtual machine is switched back to the first page table, if a hot migration exception occurs during the process of hot migration.

For details of implementations of each step in the program 810, reference may be made to corresponding descriptions in corresponding steps and units in the embodiments of the virtual machine hot migration methods, which are not repeated herein. One skilled in the art can clearly understand that, for the convenience and simplicity of description, specific working processes of the devices and modules described above can be referenced to corresponding process descriptions in the foregoing method embodiments, which will not be repeated herein.

In the electronic device of this embodiment, a first page table and a second page table are set in a first physical machine, and the first and second page tables are both used to indicate a mapping relationship between a memory address of a virtual guest and a physical address of a host machine to form a main/backup setting of the mapping relationship. A difference is that a size of a physical memory page indicated by a last-level page table of the second page table satisfies a defined size, such as the conventionally used 4K BYTES size, while a size of a physical memory page indicated by a last-level page table of the first page table is larger than the defined size, which is commonly referred to as a "large page". Thus, a virtual machine hot migration a can be realized according to the second page table. On the one hand, since the size of the physical memory page corresponding to the second page table satisfies the defined size, i.e., satisfying a size requirement of hot migration for the physical memory page, the success rate and performance of the virtual guest and the hot migration thereof are improved. On the one hand, using the main/backup setting and reasonable switching of the first page table and the second page table, a process of converting the page size of the physical memory to a page size required for hot migration will not introduce a suspension of the virtual machine or other problems that would impact the performance of operations of the virtual machine, thus greatly reducing adverse effects on operations of the virtual guest that are caused by a change in size of the page table of the hot migration.

Figure 9:
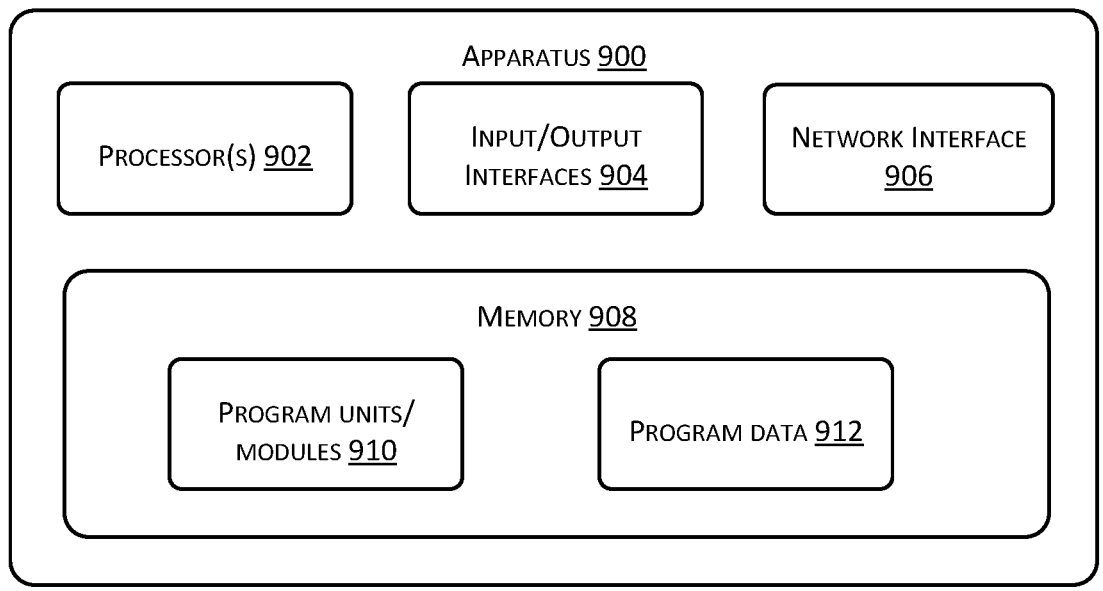
FIG. 9 is a structural block diagram of the example apparatuses described in FIGS. 6 and 7 in further detail.

FIG. 9 shows an example apparatus 900, such as the apparatuses shown in FIGS. 6 and 7 in further detail. In implementations, the example apparatus 900 may represent any one of the foregoing apparatuses. By way of example and not limitation, the apparatus 900 may include one or more processors 902, an input/output (I/O) interface 904, a network interface 906, and memory 908.

The memory 908 may include a form of computer readable media such as a volatile memory, a random access memory (RAM) and/or a non-volatile memory, for example, a read-only memory (ROM) or a flash RAM. The memory 908 is an example of a computer readable media. In implementations, the memory 908 may include program units/modules 910 and program data 912. The program units/ modules 910 may include one or more of the foregoing units and/or modules as described in the foregoing embodiments and shown in the figures.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

It should be pointed out that according to the needs of implementations, each component/step described in the embodiments of the present disclosure can be split into more components/steps, or two or more components/steps or parts of operations of components/steps can be combined into new components/steps to achieve the purpose of the embodiments of the present disclosure.

The above methods according to the embodiments of the present disclosure can be implemented in hardware, firmware, or implemented as software or computer code that can be stored in a recording medium (such as CD ROM, RAM, a floppy disk, a hard disk, or a magnetic disk or an optical disk), or implemented as a computer code that is originally stored in a remote recording medium or a non-transitory machine-readable medium, downloaded through a network, and stored in a local recording medium. As such, the methods described herein can be processed by such software that is stored in a recording medium and uses a general-purpose computer, a dedicated processor, or a programmable or dedicated hardware (such as ASIC or FPGA). It can be understood that a computer, a processor, a microprocessor controller, or programmable hardware includes a storage component (for example, RAM, ROM, flash memory, etc.) that can store or receive a software or computer code. When the software or computer code is accessed and executed by a computer, a processor or hardware, the virtual machine hot migration method(s) described herein is/are implemented. In addition, when a general-purpose computer accesses code(s) for implementing the virtual machine hot migration method(s) shown herein, an execution of the code(s) converts the general-purpose computer into a special computer for executing the virtual machine hot migration method(s) shown herein.

One of ordinary skill in the art may be aware that the units and method steps of the examples described in combination with the embodiments disclosed herein can be implemented by electronic hardware or a combination of computer software and electronic hardware. Whether these functions are executed by hardware or software depends on specific applications and design constraint requirements of the technical solutions. One skilled in the art can use different methods for each specific application to implement the described functions, but such implementation should not be considered as going beyond the scope of the embodiments of the present disclosure.

The above implementations are only used to illustrate the embodiments of the present disclosure, and are not intended to limit the embodiments of the present disclosure. One of ordinary skill in the relevant technical field can also make various modifications and changes without departing from the spirit and scope of the embodiments of the present disclosure. Therefore, all equivalent technical solutions also belong to the scope of the embodiments of the present disclosure, and the scope of patent protection of the embodiments of the present disclosure needs to be defined by the claims.

The present disclosure can be further understood using the following clauses.

Clause 1: A virtual machine hot migration method, comprising: switching a first page table used for indicating a mapping relationship between a memory address of a virtual guest and a physical address of a host machine in a first physical machine to a second page table according to a switching trigger instruction; and performing a hot migration of the virtual guest from the first physical machine to the second physical machine according to the second page table, wherein a size of a physical memory page indicated by a last-level page table of the second page table satisfies a defined size, and a size of a physical memory page indicated by a last-level page table of the first page table is greater than the defined size.

Clause 2: The method according to Clause 1, wherein switching the first page table used for indicating the mapping relationship between the memory address of the virtual guest and the physical address of the host machine in the first physical machine to the second page table according to the switching trigger instruction comprises: switching a currently used active page table of a virtual machine from the first page table to the second page table according to the switching trigger instruction; and sending an instruction signal for instructing to perform page table reloading to all virtual guests in the first physical machine to instruct each virtual guest to switch a currently used page table node in the first page table to a corresponding page table node in the second page table.

Clause 3: The method according to Clause 2, wherein switching the currently used active page table of the virtual machine from the first page table to the second page table according to the switching trigger instruction comprises: creating the second page table according to the first page table after receiving the switching trigger instruction; and after the second page table is successfully created, switching the currently used active page table of the virtual machine from the first page table to the second page table.

Clause 4: The method according to Clause 3, wherein switching the currently used active page table of the virtual machine from the first page table to the second page table comprises: determining a variable value corresponding to a first variable pointing to a root page table of the active page table of the virtual machine, and determining the currently used active page table of the virtual machine as the first page table according to the variable value; and resetting the first variable to a set value, deactivating the first page table according to the set value, and activating the second page table as the active page table of the virtual machine.

Clause 5: The method according to Clause 4, wherein: the first variable is a memory management unit node MMU_NODE variable, before resetting the first variable to the set value, the method further comprises: locking a memory management unit (MMU) corresponding to the first variable; and after activating the second page table as the active page table of the virtual machine, the method further includes: unlocking the MMU.

Clause 6: The method according to Clause 4, wherein sending the instruction signal for instructing to perform the page table reloading to all the virtual guests in the first physical machine to instruct each virtual guest to switch the currently used page table node in the first page table to the corresponding page table node in the second page table, comprises: sending an instruction signal for instructing to perform page table reloading to virtual processors corresponding to all the virtual guests in the first physical machine to instruct each virtual processor to switch a currently used page table node in the first page table to a corresponding page table node in the second page table.

Clause 7: The method according to Clause 6, wherein each virtual processor switches the currently used page table node in the first page table to the corresponding page table node in the second page table in the following manner: each virtual processor checking whether a variable value of a second variable pointing to the root page table currently used by each virtual processor is consistent with the variable value of the first variable according to the instruction signal; and using the variable value of the first variable to replace the variable value of the second variable if being inconsistent.

Clause 8: The method according to any one of Clauses 1-7, further comprising: determining whether the hot migration is successful; releasing the first page table and the second page table in the first physical machine if the hot migration is successful; and switching the second page table back to the first page table, and releasing the second page table in the first physical machine If the hot migration fails.

Clause 9: The method according to any one of Clauses 3-7, wherein creating the second page table according to the first page table comprises: traversing a memory reverse mapping table corresponding to a virtual memory slot pointed to by the first page table, and creating the second page table according to a traversal result.

Clause 10: The method according to Clause 9, wherein creating the second page table according to the traversal result comprises: copying and generating a last-level page table entry in the second page table according to each last-level page table item that is traversed, and using a set identifier to mark the generated last-level page table entry; determining whether a size of a physical memory page pointed to by the generated last-level page table entry is greater than a set size; and if greater, deleting the set identifier corresponding to the last-level page table entry, and create at least one-level sub-page table entry according to the size of the physical memory page pointed to by the last-level page table entry, wherein a size of a physical memory page pointed to by a last-level page table entry in the at least one-level sub-page table entry is the set size.

Clause 11: The method according to Clause 9, further comprising: determining whether an upper-level page table corresponding to the generated last-level page table entry exists; and if not exist, generating a corresponding upper-level page table for the last-level page table entry, and save thereof into the second page table.

Clause 12: The method according to Clause 9, wherein: when a physical memory page of the host machine is mapped to multiple virtual guest memory pages, the memory reverse mapping table stores a linked list of corresponding multiple last-level page table entries that point to the physical memory page.

Clause 13: The method according to Clause 12, wherein traversing the memory reverse mapping table corresponding to the virtual memory slot pointed to by the first page table, and creating the second page table according to the traversal result comprise: obtaining the memory reverse mapping table corresponding to the virtual memory slot pointed to by the first page table; traversing entries of the memory reverse mapping table one by one, and determining whether the linked list is stored in a current entry; if the linked list is stored, traversing each last-level page table entry in the linked list, and copying information of multiple last-level page table entries corresponding to the linked list and content of each last-level page table entry that is traversed to the second page table; and if the linked list is not stored, copying content of the current table entry to the second page table.

Clause 14: The method according to any one of Clauses 1-7, further comprising: first releasing the second page table if a hot migration abnormality occurs during a process of the hot migration, and then releasing the first page table after the currently used active page table of the virtual machine is switched back to the first page table.

Clause 15: A virtual machine hot migration apparatus, comprising: a switching module configured to switch a first page table used for indicating a mapping relationship between a memory address of a virtual guest and a physical address of a host machine in a first physical machine to a second page table according to a switching trigger instruction; and a hot migration module configured to hot migrate the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

Clause 16: The apparatus according to Clause 15, wherein the switching module comprises: an active page table switching sub-module configured to switch a currently used active page table of a virtual machine from the first page table to the second page table according to the switching trigger instruction; and an instruction sub-module configured to send an instruction signal for instructing to perform page table reloading to all virtual guests in the first physical machine, to instruct each virtual guest to switch a currently used page table node in the first page table to a corresponding page table node in the second page table.

Clause 17: The apparatus according to Clause 16, wherein the active page table switching sub-module comprises: a creation unit configured to create the second page table according to the first page table after receiving the switching trigger instruction; and a post-creation switching unit configured to switch the currently used active page table of the virtual machine from the first page table to the second page table after the second page table is successfully created.

Clause 18: The apparatus according to Clause 17, wherein the post-creation switching unit is configured to determine a variable value corresponding to a first variable pointing to a root page table of the active page table of the virtual machine after the second page table is successfully created, and determine that the currently used active page table of the virtual machine is the first page table according to the variable value; and reset the first variable to a set value, deactivate the first page table according to the set value, and activate the second page table as the active page table of the virtual machine.

Clause 19: The apparatus according to Clause 18, wherein: the first variable is a memory management unit node MMU_NODE variable; the post-creation switching unit is further configured to lock a memory management unit MMU corresponding to the first variable before resetting the value of the first variable to the set value; and unlock the MMU after activating the second page table as the virtual machine active page table.

Clause 20: The apparatus according to Clause 18, wherein the instruction sub-module is configured to send an instruction signal for instructing to reload the page table to virtual processors corresponding to all virtual guests in the first physical machine, to instruct each virtual processor to switch the currently used page table node in the first page table to the corresponding page table node in the second page table.

Clause 21: The apparatus according to Clause 20, wherein each virtual processor switches the currently used page table node in the first page table to the corresponding page table node in the second page table in the following manner: each virtual processor checking whether a variable value of a second variable that points to a root page table currently used by the respective virtual processor is consistent with a variable value of the first variable according to the instruction signal; and if not consistent, using the variable value of the first variable to replace the variable value of the second variable.

Clause 22: The apparatus according to any one of Clauses 15-21, wherein the apparatus further comprises: a first hot migration processing module configured to determine whether the hot migration is successful; release the first page table and the second page table in the first physical machine if the hot migration is successful; and switch the second page table back to the first page table, and release the second page table in the first physical machine if the hot migration fails.

Clause 23: The apparatus according to any one of Clauses 17-21, wherein the creation unit is configured to traverse a memory reverse mapping table corresponding to a virtual memory slot pointed to by the first page table after receiving a switching trigger instruction, and create the second page table according to a traversal result.

Clause 24: The apparatus according to Clause 23, wherein the creation unit is configured to traverse a memory reverse mapping table corresponding to a virtual memory slot pointed to by the first page table after receiving the switching trigger instruction; copy and generate a last-level page table entry in the second page table according to each last-level page table item that is traversed, and use a set identifier to mark the generated last-level page table entry; determine whether a size of a physical memory page pointed to by the generated last-level page table entry is greater than a set size; and if greater, delete the set identifier corresponding to the last-level page table entry, and create at least one-level sub-page table entry according to the size of the physical memory page pointed to by the last-level page table entry, wherein a size of a physical memory page pointed to by a last-level page table entry in the at least one-level sub-page table entry is the set size.

Clause 25: The apparatus according to Clause 23, wherein the creation unit is further configured to determine whether an upper-level page table corresponding to the generated last-level page table entry exists; and if not exist, generate a corresponding upper-level page table for the last-level page table entry, and save thereof into the second page table.

Clause 26: The apparatus according to Clause 23, wherein: when a physical memory page of the host machine is mapped to multiple virtual guest memory pages, the memory reverse mapping table stores a linked list of corresponding multiple last-level page table entries that point to the physical memory page.

Clause 27: The apparatus according to Clause 26, wherein: when the creation unit traverses a memory reverse mapping table corresponding to a virtual memory slot pointed to by the first page table, and creates the second page table according to a traversal result: the memory reverse mapping table corresponding to the virtual memory slot pointed to by the first page table is obtained; entries of the memory reverse mapping table are traversed one by one to determine whether the linked list is stored in a current entry; if the linked list is stored, each last-level page table entry in the linked list is traversed, and information of multiple last-level page table entries corresponding to the linked list and content of each last-level page table entry that is traversed are copied to the second page table; and if the linked list is not stored, content of the current table entry is copied to the second page table.

Clause 28: The apparatus according to any one of Clauses 15-21, wherein the apparatus further comprises: a second hot migration processing module configured to first release the second page table if a hot migration abnormality occurs during a process of the hot migration, and then release the first page table after the currently used active page table of the virtual machine is switched back to the first page table.

Clause 29: An electronic device comprising: a processor, a memory, a communication interface, and a communication bus, and the processor, the memory, and the communication interface communicating with each other through the communication bus, wherein: the memory is configured to store at least one executable instruction, and the executable instruction causes the processor to perform operations corresponding to the virtual machine hot migration method according to any one of Clauses 1-14.

Clause 30: A computer storage medium with a computer program stored thereon, which when executed by a processor, implements the virtual machine hot migration method according to any one of Clauses 1-14.

What is claimed is:

1. A method comprising:
switching a first page table used for indicating a mapping relationship between a memory address of a virtual guest and a physical address of a host machine in a first physical machine to a second page table according to a switching trigger instruction;
performing a hot migration of the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size;
determining whether the hot migration is successful;
releasing the first page table and the second page table in the first physical machine if the hot migration is successful; and
switching the second page table back to the first page table, and releasing the second page table in the first physical machine If the hot migration fails.

2. The method according to claim 1, wherein switching the first page table used for indicating the mapping relationship between the memory address of the virtual guest and the physical address of the host machine in the first physical machine to the second page table according to the switching trigger instruction comprises:

switching a currently used active page table of a virtual machine from the first page table to the second page table according to the switching trigger instruction; and sending an instruction signal for instructing to perform page table reloading to all virtual guests in the first physical machine to instruct each virtual guest to switch a currently used page table node in the first page table to a corresponding page table node in the second page table.

3. The method according to claim 2, wherein switching the currently used active page table of the virtual machine from the first page table to the second page table according to the switching trigger instruction comprises:

creating the second page table according to the first page table after receiving the switching trigger instruction; and after the second page table is successfully created, switching the currently used active page table of the virtual machine from the first page table to the second page table.

4. The method according to claim 3, wherein switching the currently used active page table of the virtual machine from the first page table to the second page table comprises:

determining a variable value corresponding to a first variable pointing to a root page table of the currently used active page table of the virtual machine, and determining the currently used active page table of the virtual machine as the first page table according to the variable value; and resetting the first variable to a set value, deactivating the first page table according to the set value, and activating the second page table as the currently used active page table of the virtual machine.

5. The method according to claim 4, wherein the first variable is a memory management unit node MMU_NODE variable, and the method further comprises:

locking a memory management unit (MMU) corresponding to the first variable before resetting the first variable to the set value; and unlocking the MMU after activating the second page table as the active page table of the virtual machine.

6. The method according to claim 4, wherein sending the instruction signal for instructing to perform the page table reloading to all the virtual guests in the first physical machine to instruct each virtual guest to switch the currently used page table node in the first page table to the corresponding page table node in the second page table, comprises:

sending an instruction signal for instructing to perform page table reloading to virtual processors corresponding to all the virtual guests in the first physical machine to instruct each virtual processor to switch a currently used page table node in the first page table to a corresponding page table node in the second page table.

7. The method according to claim 6, wherein each virtual processor switches the currently used page table node in the first page table to the corresponding page table node in the second page table by:

each virtual processor checking whether a variable value of a second variable pointing to the root page table currently used by each virtual processor is consistent with the variable value of the first variable according to the instruction signal; and using the variable value of the first variable to replace the variable value of the second variable if being inconsistent.

8. The method according to claim 3, wherein creating the second page table according to the first page table comprises:

traversing a memory reverse mapping table corresponding to a virtual memory slot pointed to by the first page table, and creating the second page table according to a traversal result.

9. The method according to claim 8, wherein creating the second page table according to the traversal result comprises:

copying and generating a last-level page table entry in the second page table according to each last-level page table item that is traversed, and using a set identifier to mark the generated last-level page table entry;

determining whether a size of a physical memory page pointed to by the generated last-level page table entry is greater than a set size; and if greater, deleting the set identifier corresponding to the last-level page table entry, and create at least one-level sub-page table entry according to the size of the physical memory page pointed to by the last-level page table entry, wherein a size of a physical memory page pointed to by a last-level page table entry in the at least one-level sub-page table entry is the set size.

10. The method according to claim 9, further comprising:

determining whether an upper-level page table corresponding to the generated last-level page table entry exists; and if not exist, generating a corresponding upper-level page table for the last-level page table entry, and save thereof into the second page table.

11. The method according to claim 8, wherein:

when a physical memory page of the host machine is mapped to multiple virtual guest memory pages, the memory reverse mapping table stores a linked list of corresponding multiple last-level page table entries that point to the physical memory page.

12. The method according to claim 11, wherein traversing the memory reverse mapping table corresponding to the virtual memory slot pointed to by the first page table, and creating the second page table according to the traversal result comprise:

obtaining the memory reverse mapping table corresponding to the virtual memory slot pointed to by the first page table;

traversing entries of the memory reverse mapping table one by one, and determining whether the linked list is stored in a current table entry;

if the linked list is stored, traversing each last-level page table entry in the linked list, and copying information of multiple last-level page table entries corresponding to the linked list and content of each last-level page table entry that is traversed to the second page table; and if the linked list is not stored, copying content of the current table entry to the second page table.

13. The method according to claim 2, further comprising:

first releasing the second page table if a hot migration abnormality occurs during a process of the hot migration, and then releasing the first page table after the currently used active page table of the virtual machine is switched back to the first page table.

14. An apparatus comprising:

one or more processors;

memory;

a switching module stored in the memory and executable by the one or more processors to switch a first page table used for indicating a mapping relationship between a memory address of a virtual guest and a physical address of a host machine in a first physical machine to a second page table according to a switching trigger instruction, wherein the switching module comprises:

an active page table switching sub-module configured to switch a currently used active page table of a virtual machine from the first page table to the second page table according to the switching trigger instruction; and an instruction sub-module configured to send an instruction signal for instructing to perform page table reloading to all virtual guests in the first physical machine, to instruct each virtual guest to switch a currently used page table node in the first page table to a corresponding page table node in the second page table; and a hot migration module configured to hot migrate the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size.

15. The apparatus according to claim 14, wherein the active page table switching sub-module comprises:

a creation unit configured to create the second page table according to the first page table after receiving the switching trigger instruction; and a post-creation switching unit configured to switch the currently used active page table of the virtual machine from the first page table to the second page table after the second page table is successfully created.

16. The apparatus according to claim 15, wherein the post-creation switching unit is configured to determine a variable value corresponding to a first variable pointing to a root page table of the currently used active page table of the virtual machine after the second page table is successfully created, and determine that the currently used active page table of the virtual machine is the first page table according to the variable value; and reset the first variable to a set value, deactivate the first page table according to the set value, and activate the second page table as the currently used active page table of the virtual machine.

17. The apparatus according to claim 16, wherein:

the first variable is a memory management unit node MMU_NODE variable; and the post-creation switching unit is further configured to lock a memory management unit MMU corresponding to the first variable before resetting the value of the first variable to the set value; and unlock the MMU after activating the second page table as the currently used active page table of the virtual machine.

18. One or more computer storage media storing executable instructions that, when executed by one or more processors, cause the one or more processors to perform acts comprising:

switching a first page table used for indicating a mapping relationship between a memory address of a virtual guest and a physical address of a host machine in a first physical machine to a second page table according to a switching trigger instruction;

performing a hot migration of the virtual guest from the first physical machine to a second physical machine according to the second page table, wherein a size of a physical memory page indicated by a last-level page table of the second page table satisfies a defined size, and a size of a physical memory page indicated by a last-level page table of the first page table is greater than the defined size;

determining whether the hot migration is successful;

releasing the first page table and the second page table in the first physical machine if the hot migration is successful; and switching the second page table back to the first page table, and releasing the second page table in the first physical machine If the hot migration fails.

\* \* \* \* \*